(No Model.)
C. E. PRATT.
VEHICLE WHEEL.
No. 308,794. Patented Dec. 2, 1884.
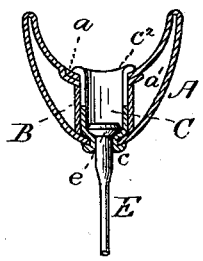
Fig. 6.
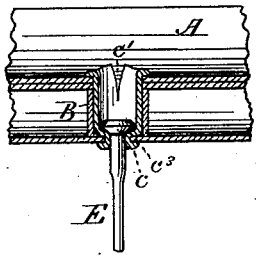
Fig. 7.
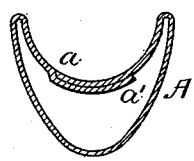
Fig. 1.
Fig. 3.
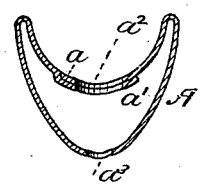
Fig. 2.
Fig. 4.
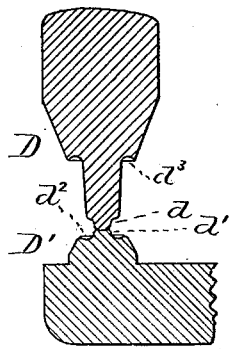
Fig. 5.
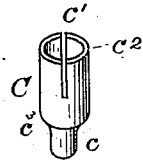
Fig. 8.
WITNESSES
H. I. Nash
A. L. Atkins
INVENTOR
Charles E. Pratt

UNITED STATES PATENT OFFICE.

CHARLES E. PRATT, OF BOSTON, MASSACHUSETTS, ASSIGNOR TO THE POPE MANUFACTURING COMPANY, OF HARTFORD, CONNECTICUT.

VEHICLE-WHEEL.

SPECIFICATION forming part of Letters Patent No. 308,794, dated December 2, 1884.

Application filed April 25, 1884. (No model.)

*To all whom it may concern:*

Be it known that I, CHARLES E. PRATT, of the city of Boston, and State of Massachusetts, have invented certain new and useful Improvements in Vehicle-Wheels, of which the following is a specification.

My improvements relate to that class of vehicle-wheels known as "suspension-wheels," and were designed more particularly for bicycle and tricycle wheels adapted to receive rubber tires, though they are equally applicable for metallic wheels for any other vehicles or purposes, and more specifically they relate to wheels having hollow or tubular rims.

Heretofore hollow or tubular rims have been formed in several ways—of lengths of tubing either seamless drawn, or made like gas-pipe, or of tubing made from sheet metal by bending it over and lapping the edges and brazing them, &c., and the spokes have been held in such rims by means of either nuts or heads and plates, or have been threaded and screwed into nipples held in the rim.

In order to make rims light, very thin metal is used and is desirable, and yet even in light wheels great rigidity is necessary and great strength at the points where the spokes draw.

In hollow rims heretofore constructed defects have been found in want of vertical and lateral rigidity, in effective and simple connection of the spoke with the rim, and in economy of construction; and it is the object of my improvements, among other things, to provide a hollow rim free from these defects and disadvantages.

In constructing a bicycle-wheel, for instance, (shown in the accompanying drawings,) so as to embody my improvements in one form, I proceed as follows: I take sheet metal, and by means of suitable machinery in any approved manner shape it into a form approximately shown in cross-section at A in Figure 1, for the rim or felly of the wheel, by preference having the lapped edges on the upper side or concave side of the rim, as shown at $a$ $a'$, and with these edges lapped for a considerable distance for security, in which position they may be left without other security than the means below referred to. I then drill at the proper intervals or distances apart for spokes, concentrically two holes, $a^2$ $a^3$, as indicated in the cross-section shown in Fig. 2, the one hole being drilled in the concave side of the rim and of larger diameter, the other hole being drilled in the lower side of the rim and of smaller diameter. I form split rings or short tubes B, (shown in Fig. 3,) of about the external diameter of the holes $a^2$ and of the length required to fill the distance between the concave and the convex sides of the rim inside. This brace-ring B may have the two edges lapped, as shown, a slight distance, or may be made in a true cylinder. I also make cylindrical tubes or struts C, (shown in Fig. 4,) of about the same external diameter as the holes $a^2$ for the main part, but having a smaller part or teat, $c$, and a taper shoulder, $c^3$, and the larger end, $c^2$, of this cylindrical strut C may be sawed or split, as shown at $c'$. This may either be struck up from sheet metal or turned out by other machinery. The brace B serves not only radially to hold the tire side and the inner side of the rim apart, and each including the lapped edges, against the clamping hold of the two ends of the strut, but also transversely and diagonally to brace and stiffen the rim against torsional and side strains and make it more secure against "buckling." I have also as an additional tool for construction an upper die, D, (shown in vertical section in Fig. 5,) formed with a slightly-tapered cylindrical part of about the diameter of the hole $a^2$, less twice the thickness of the metal used for the strut C, formed with a curved or tapered and recessed shoulder at the top $d^2$, and with a smaller portion, $d$, like a teat at the bottom, and an under die, D', having a slight upward projection, $d'$, and a curved slightly-recessed shoulder, $d^2$, the upper die, D, being arranged in a power-press or otherwise to be operated to and from the die D' by any approved mechanism. Now the die D, being raised a sufficient height from D', I take the rim drilled, as shown in section in Fig. 2, and place it on the die D', so that the hole $a^3$ rests on the projection $d'$. I then drop in a brace or ring, B, through the hole $a^2$, bring down the die D, spreading the brace B to the size of the die in internal diameter within the rim. I then raise the die D and drop into the hole $a^2$ through the ring B and into the hole $a^3$ a strut, C, and place the rim so that the opening in the bottom of the small cylindrical part $c$ of the strut is on the projection $d'$. I then bring down the die D again within the strut C, by which the upper edge, $c^2$, of the strut is overturned upon the edges of the concave part of the rim, the shoulder $c^3$ is flattened slightly, the lower edge, $c$, on the strut is upturned upon the edges of the convex side of the rim, and the two leaves or lapped edges, $a\ a'$, of the concave side of the rim, the brace B, and the under side of the rim, are secured rigidly together by means of the strut C, as shown in cross-section in Fig. 6, and in transverse section in Fig. 7. The interior of the cylindrical strut C is of about the diameter of the head $e$ of the spoke E, which I use in constructing the wheel, and the interior diameter of the smaller part $c$ is made of about the diameter of the upper end of the spoke just below the head $e$, and the shoulder $c^3$, somewhat flattened by the operation of the die D, forms a seat for the head of the spoke, which may be freely turned therein.

Instead of making the cylindrical brace B and the strut C separate, as above shown and described, I may form them together in one piece of metal, as shown in Fig. 8, the cylindrical strut C' having turned or otherwise formed on it the projection or shoulder B', in which case it is obvious that the external diameter of B', being about the same as that of the holes $a^2$, and being inserted through said hole or perforation and operated by the die D, will be enlarged or spread so as to throw the projection under the concave edges of the rim and hold them in a similar way as before.

In the drawings the same reference-letters denote the same parts in all the figures, and Fig. 1 shows in cross-section the wheel-rim as I construct it in one form before it is prepared to receive the spokes. Fig. 2 shows the same after being bored or drilled to receive the struts and braces. Fig. 3 shows the braces in one form. Fig. 4 shows the strut in one form and separated from the braces. Fig. 5 shows in section the dies for placing and securing struts and braces in position. Fig. 6 shows the same cross-section of rim as Figs. 1 and 2, and also section of the strut and brace in position, and part of the spoke. Fig. 7 shows the same things as Fig. 6 in a section made at right angles to the plane of the latter, and Fig. 8 shows in one form the strut and brace combined in one piece. It is obvious that with this construction the upper and lower sides of the rim are strongly braced and held together, and that the rim is also braced and made more rigid laterally, and that a secure seat for the spoke is formed, which, though the metal of the rim be thin, cannot yield to the draw of the spoke, and also that the lapped edges of the sheet metal of which the rim is formed cannot part, whether brazed or not, under any reasonable use or jarring. It is also obvious that the spoke may be inserted with a nut or threaded into the lower part of the strut, and that the lapped edges of the rim may be on the under or convex side, instead of on the upper concave side, and that other modifications in form may be made without departing from the spirit of my invention; and I do not mean to limit my claim strictly to the forms or proportions, or the precise method of putting the parts together herein described; nor is it absolutely necessary to use the dies D D' in the manner described, though I think that the preferable way.

I am aware of Letters Patents of the United States, Nos. 280,633 and 289,733, and I do not claim anything shown or described therein.

I claim as new and of my invention—

1. A metallic truss-wheel rim, consisting in a tubular felly prepared for the reception of spokes and a tire, and with its tire side and opposite side braced radially apart at the openings for spokes, essentially as set forth.

2. A metallic truss-wheel rim, consisting in a tubular felly prepared for the reception of spokes and a tire, and with its tire side and opposite side held toward each other by positive devices at the openings for spokes, essentially as set forth.

3. A hollow metallic felly constructed of sheet metal, with lapping edges, held together and to the opposite side of the rim by means of metallic struts at the openings for spokes, essentially as set forth.

4. In a hollow metallic felly, a tubular seat for the headed end of the spoke constructed to distribute the strain of the spoke upon both the inner and the tire sides of the felly, essentially as set forth.

5. In a hollow metallic felly, a metallic brace between the inner side and tire side, constructed and adapted to operate both radially and transversely within the felly to hold its opposite sides apart and stiffen the structure without dependence upon the tire, essentially as set forth.

6. In a hollow metallic felly, a metallic strut constructed and combined with said felly so as either to fasten the lapping edges together or to hold the tire side and the inner side radially toward each other, or both these two things at the same time, essentially as set forth.

7. Constructed and combined in a tubular metallic felly, a brace bearing against the opposite interior surfaces of the felly, and a strut to hold upon the opposite exterior surfaces of the felly, essentially as set forth.

8. The combination of spoke D, strut C, brace B, and rim A, constructed and adapted to operate essentially as set forth.

9. A hollow metallic wheel-rim constructed with a series of smaller apertures in the inner convex side, a corresponding series of larger apertures in the outer concave side, and a series of metallic braces and struts constructed to hold fast together and apart the sides of the rim, and to afford means of connection of a series of spokes with the rim and to distribute the strain of the spokes to both sides of the rim.

10. A wholly or partially perforated metallic strut, C, having a smaller end, $c$, and a larger end, $c^2$, and a shoulder, $c^3$, constructed and adapted for insertion and fastening in a tubular felly, essentially as set forth.

CHARLES E. PRATT.

Witnesses:
H. I. NASH,
A. L. ATKINS.